INVENTOR:
MARTIN G. GABRIEL
BY
ATTORNEYS.

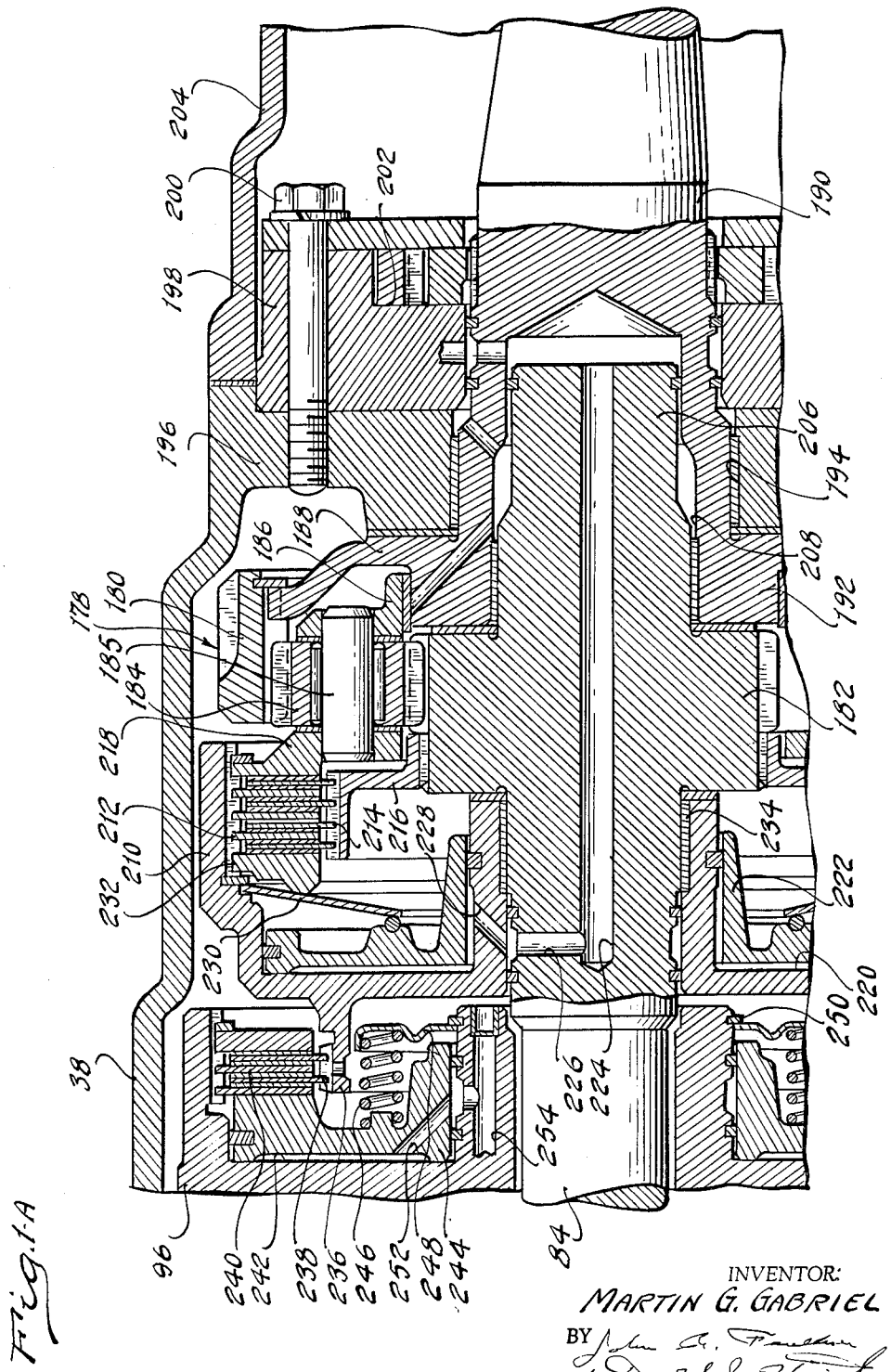

Jan. 25, 1966
M. G. GABRIEL
3,230,716
MULTIPLE ELEMENT HYDROKINETIC TORQUE
CONVERTER MECHANISM WITH DUAL
PERFORMANCE RANGES
Filed Dec. 30, 1963
4 Sheets-Sheet 3
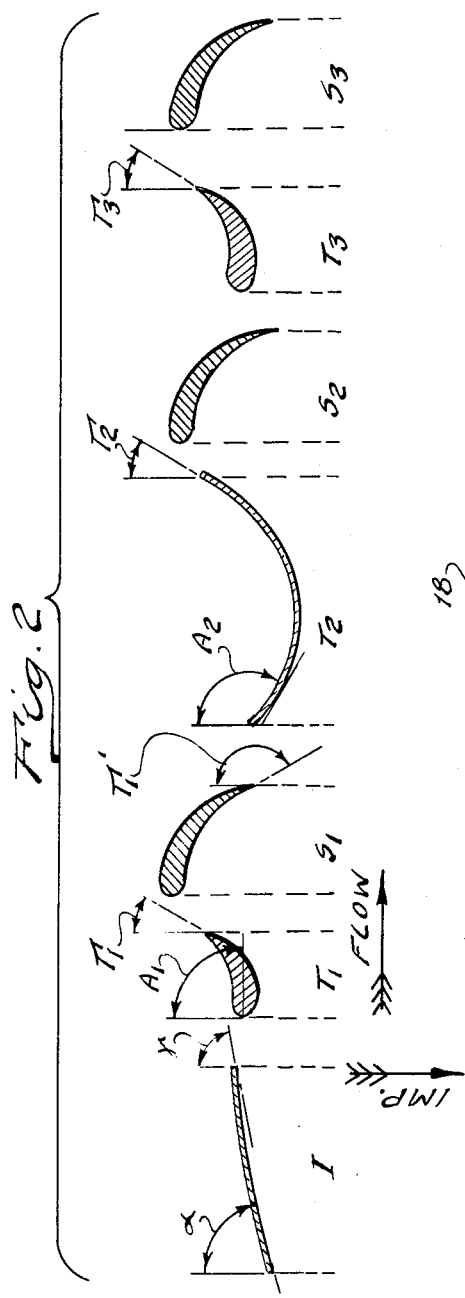
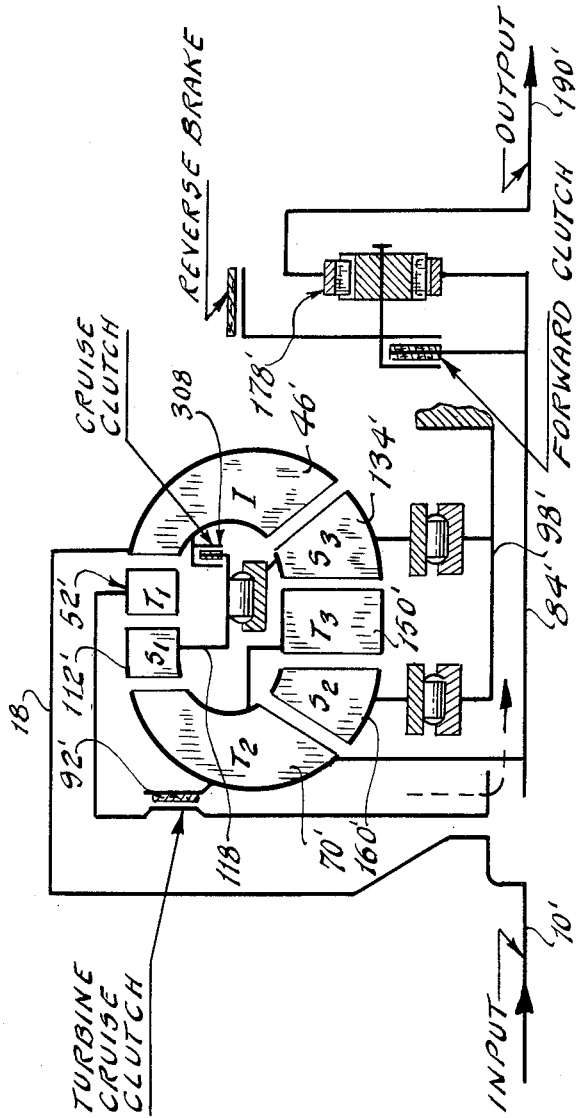
INVENTOR:
MARTIN G. GABRIEL
BY
ATTORNEYS.

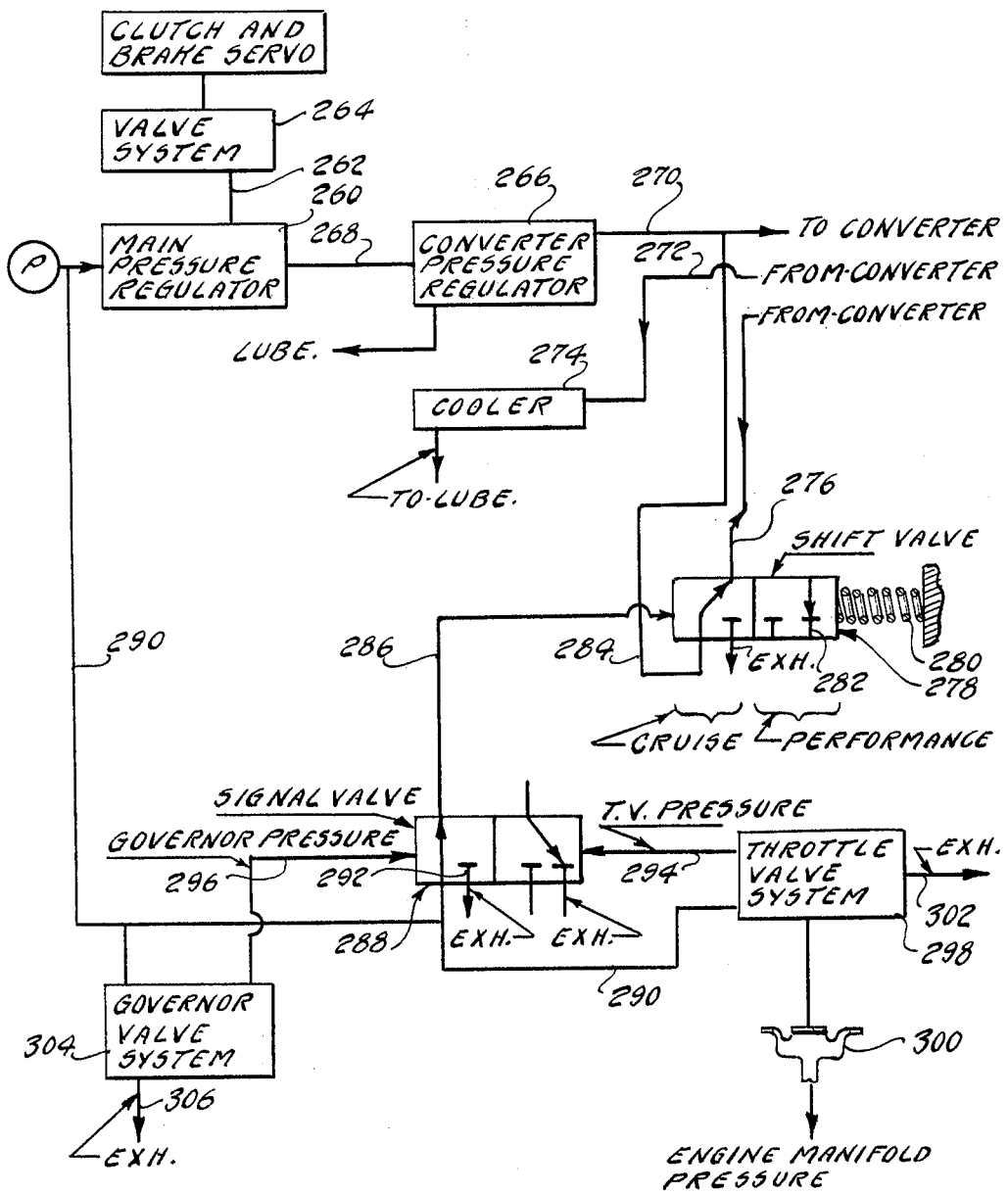

United States Patent Office 3,230,716
Patented Jan. 25, 1966

3,230,716
MULTIPLE ELEMENT HYDROKINETIC TORQUE CONVERTER MECHANISM WITH DUAL PERFORMANCE RANGES
Martin George Gabriel, Dearborn, Mich., assignor to Ford Motor Company, Dearborn, Mich., a corporation of Delaware
Filed Dec. 30, 1963, Ser. No. 334,238
9 Claims. (Cl. 60—54)

My invention relates generally to hydrokinetic mechanisms having multiple hydrokinetic turbines and a cooperating impeller situated in a common torus circuit wherein the impeller is connected to a power source and the turbines are adapted to be connected to a driven member.

More particularly, my invention relates to a multiple turbine hydrokinetic torque converter mechanism wherein the turbines are provided with a geometry that will condition them for maximum torque delivery at separate stages in the converter torque ratio range, thereby providing a maximum degree of torque ratio carry-out as the overall speed ratio increases from a value of zero to the so-called coupling point.

In a preferred embodiment of my invention I have provided a multiple element hydrokinetic torque converter mechanism with three turbines and three stators in a common torus circuit. One stator is situated at the flow exit section of each turbine. The primary turbine is adapted for maximum torque delivery during low speed ratio operation.

The second and third turbines are connected together for joint rotation, and selectively engageable friction clutch means are provided for connecting the first turbine to the common second and third turbines during operation in the low speed ratio, high performance operating range. The clutch mechanism disconnects the first turbine from the second and third turbines, however, during operation in the high speed ratio cruise range. Thus the primary turbine can be designed with a geometry that will be favorable for high performance low speed ratio operation since it may assume a freewheeling or floating condition during operation in the so-called cruising range, the blading of the primary turbine will not adversely influence the performance of the converter mechanism during operation in the cruising range although the primary turbine is available for high performance, low speed ratio operation.

According to a second embodiment of my invention, I have made provision for connecting and disconnecting the primary turbine from the second and third turbines. In addition I have provided a selectively engageable cruise clutch mechanism for connecting the first stator to the impeller during operation in the cruising range so that the first turbine will function as a bladed impeller flow exit section to provide an optimum blade geometry that improves the coupling efficiency of the converter mechanism during operation in the cruising range. During operation in the low speed ratio range, however, the cruise clutch is disengaged so that the first stator is capable of functioning in the normal manner as a hydrokinetic reaction element for the toroidal fluid.

The provision of a mechanism of the type above set forth being a principal object of my invention, it is a further object of my invention to provide a hydrokinetic torque converter mechanism having multiple hydrokinetic turbines adapted for joint rotation during operation in a first performance range and wherein provision is made for effectively removing one of the turbines from the torus circuit of the converter during operation in a second performance range thereby providing an optimum blade geometry for the toroidal fluid flow conditions that exist during operation in each range.

It is a further object of my invention to provide a hydrokinetic torque converter mechanism having multiple turbines wherein provision is made for clutching one turbine to the other for joint rotation during operation in a high torque ratio performance range and for declutching the turbines to provide freewheeling motion of one of them during operation in a high speed ratio cruising range.

It is another object of my invention to provide a mechanism of the type set forth in the preceding object wherein the clutch means includes friction elements carried by the respective turbine members wherein the friction elements are urged into frictional driving relationship upon a variation in the static pressure differential between the inner torus region and the region of the converter mechanism on the exterior of the torus circuit.

Further objects and features of my invention will become apparent from the following description and from the accompanying drawings, wherein:

FIGURE 1a is a planetary reversing gear mechanism adapted to be used with the mechanism of FIGURE 1;

FIGURE 2 is a blade cascade diagram in schematic form showing the relative geometry of the various blade elements of the mechanism of FIGURE 1;

FIGURE 3 is a schematic representation of a valve system capable of controlling the turbine clutch structure shown in FIGURE 1; and FIGURE 4 is a diagrammatic assembly view showing a multiple element torque converter mechanism of the type shown in FIGURE 1 wherein provision is made for clutching the first stator to the impeller.

Figure 1:
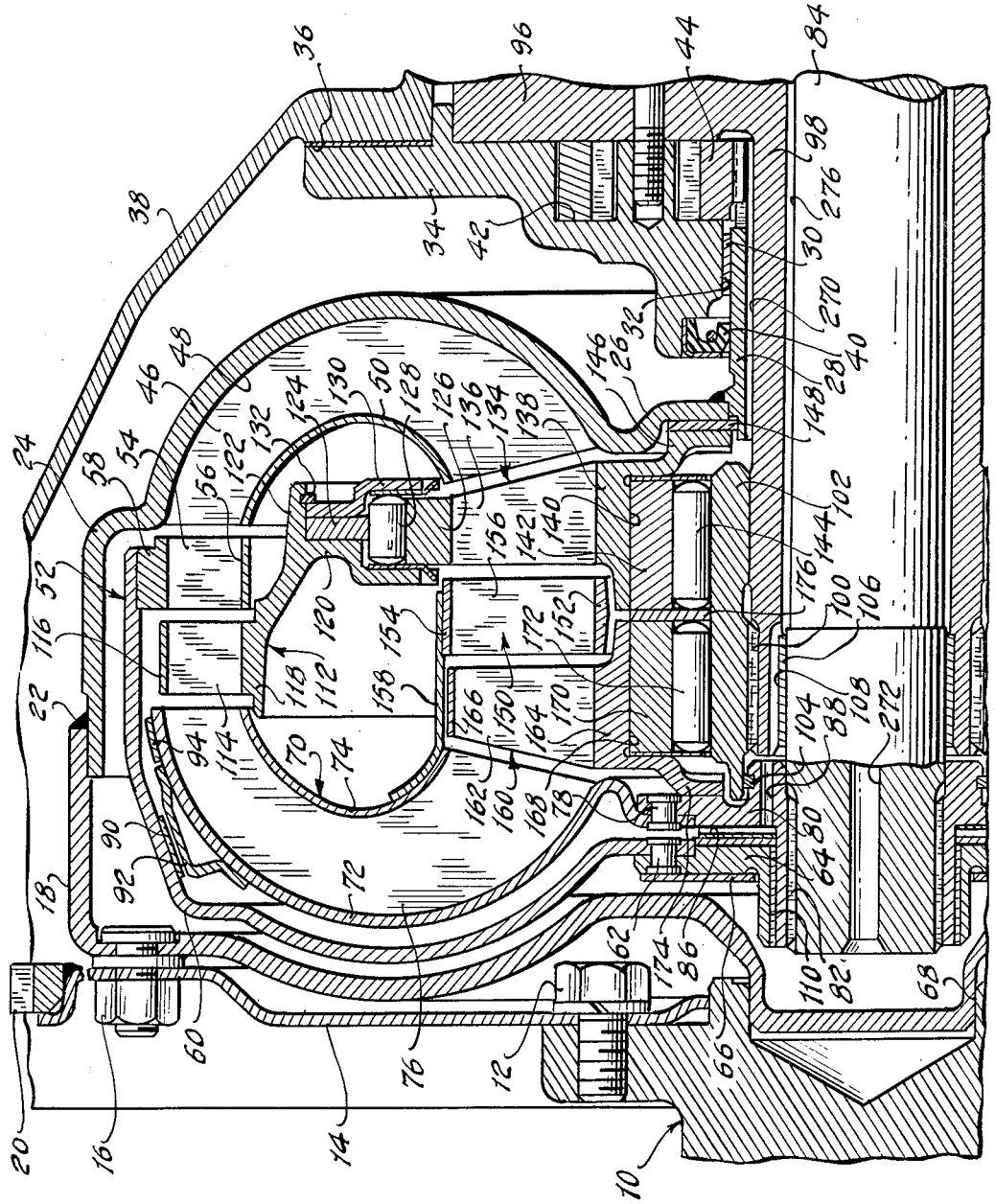
FIGURE 1 shows in longitudinal cross-sectional form a multiple element hydrokinetic torque converter mechanism capable of embodying the improvements of my invention.

Referring first to FIGURE 1, numeral 10 indicates generally a portion of an internal combustion vehicle engine. It is bolted by means of bolts 12 to the inner periphery of the drive plate 14. The outer periphery of plate 14 is secured by bolts 16 to an impeller shell part 18.

An engine starter ring gear 20 may be carried by the outer periphery of the plate 14, as indicated.

The outer periphery of impeller shell part 18 is welded at 22 to a second impeller shell part 24. This shell part 24 is toroidal in shape and its hub 26 is secured to a sleeve shaft 28. A suitable bushing 30 is employed for journaling shaft 28 within a bearing opening 32 formed in a retainer wall 34. This wall is secured to a shoulder 36 formed on the interior of a transmission housing 38.

A suitable fluid seal 40 surrounds shaft 28. A positive displacement pump chamber 42 formed in the wall 34 receives gear pump elements shown in part at 44. The driving portion of the elements 44 may be keyed in driving relationship with respect to shaft 28 so that the pump develops pressure whenever the engine is operating. The impeller shell parts 18 and 24 define in part an impeller assembly that includes also impeller blades 46 secured to the interior wall 48 of the impeller shell part 24. Secured to the inner margins of the blades 46 is an inner impeller shroud 50. The blades 46 and the shroud 50 in the shell part 24 cooperate to define radial outflow passages.

A primary turbine is shown at 52. It includes turbine blades 54, an inner shroud 56 and an outer shroud 58. The blades 54 define in part axial flow passages that form continuations of the outflow passages defined in part by the blades 46 of the impeller.

Outer shroud 58 is carried by a turbine shell 60. This shell is formed with a generally toroidal shape and is riveted by means of rivets 62 or otherwise secured to a hub 64. The thrust washer 66 is disposed between the hub 64 and the radially inward portion of the shell part 18.

The crankshaft 10 is recessed at 68 to define a pilot opening within which the central portion of shell part 18 is situated.

A secondary turbine 70 is situated in the torus circuit of which the impeller and the turbine 52 form a part. It includes an outer shroud 72, an inner shroud 74 and blades 76 situated between the shrouds 72 and 74. The hub of the shroud 72 may be riveted by means of rivets 78 to a turbine hub 80. This hub is splined at 82 to a central turbine shaft 84. A thrust washer 86 having radial grooves formed therein is situated between the hub 80 and the hub 64 to accommodate axial thrust forces. The radial passages defined by the radial grooves in the thrust washer 86 communicate with axially disposed passages 88 formed in the hub 80.

The turbine shell part 60 includes a conical portion to which a conical friction element 90 is situated. This element 90 is disposed adjacent an external conical friction element 92 that is carried by the outer shroud 72 on the turbine 70. If desired, a back-up ring 94 can be welded to the shroud 72 to anchor the element 92.

The elements 90 and 92 cooperate to define an annular fluid flow passage that communicates with the inner torus region of the hydrokinetic torque converter and also with the space between shell part 60 and the shroud 72 of the turbine 70.

Wall 34 has secured thereto a stationary adaptor 96. This adaptor is formed with a central stationary sleeve shaft 98 and extends through sleeve shaft 28. It forms also a closure for the pump chamber 42.

The sleeve shaft 98 is splined at 100 to an overrunning brake inner race 102 for the stator assembly that will be described subsequently. A fluid seal 104 is disposed between the hub 80 and the race 102.

A bushing 106 is employed for journaling the shaft 84 within the stationary sleeve shaft 98. The annular space that is defined by the shaft 84 and the surrounding sleeve shaft 98 communicates with passages 88 through axial grooves 108 formed in the end of the stationary shaft 98.

The hub 64 is journaled upon the hub 80 by means of a bushing 110.

A first stator 112 is situated between the flow exit section of the primary turbine blades 54 and the flow entrance section of the secondary turbine baldes 76. It includes primary stator blades 114, a first shroud 116 and a second shroud 118. Shroud 118 is connected to or formed integrally with a torque transfer member 120 which is formed with an internally splined portion 122 to which an externally splined cam ring 124 is connected. A second race 126 is engaged by overrunning brake roller elemets 128 which are situated within race 124. The roller elements 128 cooperate with the races to inhibit relative rotation of the stator 112 in a direction opposite the direction of rotation of the impeller and to permit freewheeling motion thereof in the opposite direction. A retainer ring 130 is secured within the internally splined portion 122 by means of a snap ring 132, thereby holding the race 124 and the rollers 128 axially fast.

Race 126 forms an outer shroud for a third stator identified generally by reference character 134. This stator includes blades 136 carried by an inner shroud ring 138. Blades 136 define axial flow passages that communicate with the flow entrance region of the bladed passages of the impeller.

Shroud ring 138 is formed with a central opening 140 which receives an outer race 142 of an overruning brake assembly. Overrunning brake elements 144 are disposed between the races 102 and 142. One of the races may be cammed to cooperate with the rollers 144 to inhibit rotation of the stator 134 in a direction opposite to the direction of rotation of the impeller, but which will permit rotation thereof in the same direction as the direction of rotation of the impeller.

Shroud ring 138 includes an inwardly extending flange 146 which may be formed with radial grooves to define radial flow passages. A thrust washer 148 is situated betwen the radially inward portion 26 of the shell part 24 and the flange 146. A third turbine 150 is situated directly adjacent the flow inlet region of the stator blades 136. It includes a shroud 152 and a shroud 154 between which are arranged turbine blades 156. Shroud 154 is connected to shroud 74 for the turbine 70 by means of a shroud extension member 158.

A second stator 160 is disposed between the flow exit region of the turbine 36 and the flow entrance region of the stator blades 156. It includes turbine blades 162 carried by a shroud ring 164. If desired, another shroud 166 may surround the blades 162. The blades 136 of the stator 134, the blades 156 of the turbine 150 and the blades 162 of the stator 160 define axial flow passages at the radially inward region of the torus circuit.

Shroud ring 164 is formed with a central opening 168 within which is received an overrunning brake outer race 170. Overrunning brake roller elements 172 are arranged between race 170 and the race 102. One of these races can be cammed to cooperate with the rollers 172 and to inhibit rotation of the stator 160 in a direction opposite to the direction of rotation of the impeller while accommodating freewheeling motion of the stator 160 in the opposite direction. An inwardly extending flange 174 retains the race 170 in place. A thrust washer 176 can be disposed between the rollers of each overrunning brake assembly and each of the races 142 and 170. The flange 174 serves also as a spacer between the stator shroud ring 164 and the hub 80 of the turbine 70.

In FIGURE 1a I have shown a reversing gear arrangement which includes a planetary gear unit 178. This planetary gear unit includes a ring gear 180, a sun gear 182 and planetary pinions 184 which engage the ring gear 180 and the sun gear 182. Pinions 184 are journaled upon pinion shafts 185 carried by a planetary carrier 186.

The ring gear 180 is supported by a radially extending portion 188 of a power output shaft 190. This portion 188 is formed with a hub 192 which forms a bearing support for the carrier 186. Shaft 190 extends axially through a bearing opening 194 formed in an end wall 196 of the housing 38. It extends also through a pump housing 198 which may be bolted to the end wall 196 by means of bolts 200. Pump housing 198 defines a pump chamber 202 within which are situated positive displacement pump elements that are connected drivably to the power output shaft 190. This pump cooperates with the front pump, shown in part at 44, to provide a pressure source for a control system to be described subsequently. A tailshaft extension housing 204, which surrounds power output shaft 190, may be bolted to the end wall 196 as indicated.

Sun gear 182 includes an extension 206 that is received within a bearing opening 208 formed in the power output shaft 190. It is connected integrally to turbine shaft 84.

A clutch drum 210 is internally splined to accommodate externally splined discs 212. These discs are situated in interdigital relationship with respect to internally splined clutch discs 214 carried by an externally splined clutch element 216. This element 216 is splined to the sun gear 182. A clutch plate back-up member 218 also is externally splined to the drum 210. It forms also a part of the carrier 186 which supports shafts 185.

Drum 210 defines an annular cylinder 220 within which is slidably positioned an annular piston 222. Cylinder 220 operates with the piston to define a working chamber that is in fluid communication with a central passage 224 formed in shaft 84. A radial passage 226 and a pressure feed port 228 establish a hydraulic connection between the cylinder 220 and the passage 224.

A Belleville type clutch disc actuator spring 230 interconnects the piston 222 and the clutch pressure plate 232. As fluid pressure is admitted to the cylinder 220, the clutch discs 214 and 212 are brought into frictional engagement, thereby establishing a driving connection between drum 210 and both the sun gear 182 and the carrier 186. The clutch disc assembly, when it is engaged in this fashion, thus establishes a direct driving condition for the planetary gear unit.

Drum 210 is journaled upon shaft 84 by means of a bushing 234. It includes an externally splined extension 236 which carries internally splined brake discs 238. These discs are situated in interdigital relationship with respect to externally splined brake discs 240. The discs 240 are carried by an internally splined portion of the adaptor 96.

The adaptor 96 defines also an annular cylinder 242 within which is positioned an annular piston 244. Piston return springs 246 are disposed between piston 244 and the spring seat member 248. This member 248 is held axially fast upon the adaptor 96 by means of a snap ring 250.

Fluid pressure may be admitted to the pressure cavity defined in part by the cylinder 242 through a pressure feed port 252 and a communicating pressure feed passage 254.

The multiple disc brake assembly shown in part 238 and 240 is disengaged during forward drive operation and the multiple disc clutch assembly shown in part at 214 and 212 is engaged. Turbine torque developed by the multiple turbines then is distributed through shaft 84 and through the locked up planetary gear unit to the power output shaft 190 during forward drive operation.

To establish reverse drive, the multiple disc clutch assembly shown at 212 and 214 is released and the multiple disc brake assembly shown at 238 and 240 is applied. This causes the carrier 186 to become anchored to the housing 38 so that it can function as a reaction member. Sun gear 182 then is driven by the turbine drive shaft 84 and the ring gear 180 thus is caused to rotate in a direction that is opposite to the direction of rotation of the turbines. Planetary gear unit 178 thus functions as a torque multiplying means as well as a motion reversing means as it powers the power output shaft 190 during reverse drive operation.

Referring next to FIGURE 2, I have illustrated in schematic form a portion of a blade cascade diagram showing the relative geometries of the blades of the hydrokinetic torque converter mechanism. The impeller has been indicated by the symbol I and the three turbines have been indicated by the symbols $T_1$, $T_2$ and $T_3$ respectively. In a similar fashion, the three stators have been indicated by the symbols $S_1$, $S_2$ and $S_3$ respectively.

As engine torque is applied to the impeller, toroidal fluid flow circulation is established in the torus circuit of the converter mechanism in the usual fashion at low speed ratios. Each of the turbines is effective to decrease the moment of momentum of the fluid that passes through the respective bladed passages of the turbines to cause a turbine torque to be developed. When the fluid passes through the first turbine blades 54, it is reversed by the first stator blades 114 before it enters the entrance region of the second turbine blades 76. In a similar fashion the second turbine blades 162 alter the tangential component of the absolute fluid flow velocity vector of the fluid flow as it leaves the exit section of the second turbine before it enters the entrance section of the third turbine blades 156.

The fluid flow that passes through the bladed passages of the third turbine is altered again so that the tangential component of the absolute fluid flow velocity vector at this point in the torus circuit is favorable for the entrance section of the impeller blades 46.

As the speed ratio increases, the direction of the absolute fluid flow velocity vector at the entrance section of the first stator changes due to the increased rotational velocity of the first turbine. As some precalibrated speed ratio the entrance angle for the absolute fluid flow velocity vector at this point in the torus circuit approaches the blade angle T' for the exit section of the first stator. The first stator then begins to freewheel by reason of the action of the overrunning brake shown in part at 128.

Upon a further increase in the overall speed ratio to a precalibrated value, the second stator 160 will begin to freewheel due to the increased rotational velocity of the second turbine 70. A final clutch point is reached at a speed ratio at which the third stator 134 begins to freewheel. Thereafter the mechanism is conditioned for coupling operation.

If it is assumed that the cone clutch shown in part at 90 and 92 is engaged, the first turbine will rotate in unison with the second and third turbines. The effective turbine entrance angle thus is shown at $A_1$ and the effective turbine exit angle is shown at $T_3$. This is the actual blade angle for the third turbine exit section.

If the converter mechanism is operating at an intermediate speed ratio that is less than the speed ratio at which the second stator begins to freewheel, the effective turbine exit angle for the first and second turbines is shown at $T_2$. This is the angle for the blades of the exit section of the second turbine. It is apparent, therefore, that during operation of the converter mechanism at intermediate speed ratios and during operation in the so-called coupling range, a substantial degree of mismatching occurs between the exit angle $T_1$ for the first turbine and the entrance angle $A_2$ for the second turbine, the former being substantially less than the latter. This produces a substantial degree of undesirable shock loss that tends to reduce the overall operating efficiency of the converter mechanism in intermediate speed ratios and during operation in the cruising range.

To eliminate this undesirable mismatching of the blade geometries I have made provision for declutching the first turbine from the second and third turbines. This is done by releasing the clutch structure shown in part at 90 and 92. Thus the first turbine is caused to freewheel along with the first stator 112. Both the first stator and the first turbine then are effective to alter the tangential component of the absolute fluid flow velocity vector of the fluid as it leaves the exit section of the impeller.

Referring next to FIGURE 3, I have shown in schematic form a valve system capable of controlling the application and release of the cone clutch assembly 90 and 92. The pump P shown in FIGURE 3 corresponds to the front pump identified in FIGURE 1 by reference characters 42 and 44. As explained previously, the pump shown in part at 202 also can be used to supplement the action of the front pump.

Pump P distributes pressure to a main regulator valve 260 which functions to provide a regulated pressure at a desired operating level. This regulated pressure then may be distributed through a passage 262 to a valve system 264 which controls distribution of pressure to clutch and brake servos for the multiple disc clutch and the multiple disc brake. Pressure is distributed also from the main regulator valve 260 to a converter pressure regulator valve 266, a suitable passage 268 being provided for this purpose. Regulated converter pressure then is distributed through a passage 270 to the torus circuit of the converter mechanism. This passage is defined in part by the annular space between sleeve shaft 28 and the stationary stator sleeve shaft 98.

The fluid then passes through the space between the hub 26 of the shell part 24 and the shroud ring 138. The fluid then traverses the torus circuit and ultimately is returned through the space between the shell part 18 and the turbine shell 60. It then passes through a central passage 272 formed in the shaft 84 and is distributed from there to an oil cooler 274. The fluid then may pass into a lubrication oil circuit which furnishes lubrication oil to the various lubrication points in the transmission mechanism.

A certain percentage of the fluid that is supplied to the torus region of the converter mechanism passes also through an annular space between the friction elements 90 and 92. When the first turbine 52 is freewheeling, this fluid passes through the grooved thrust washer 86, through passages 88 and through the annular passage between the shaft 84 and the stator sleeve shaft 98. This annular passage defines in part a flow return passage 276 which communicates with a shift valve 278.

The shift valve 278 has two operating positions that are indicated in FIGURE 3 as the cruise position and the performance position. The valve normally is urged toward the performance position by a valve spring 280. When it assumes this position, communication is established between passage 276 and an exhaust port 282. Under these conditions, the cavity between the outer tubine shroud 72 and the turbine shell 60 is subjected to a low pressure with respect to the pressure level of the fluid in the torus circuit. The adjacent friction elements 90 and 92 provide a flow restriction that causes the pressure level of the torus circuit to remain greater than the pressure that exists in this evacuated cavity. Thus the friction elements 90 and 92 are urged into frictional engagement by reason of the resiliency of the hub shroud 72 and the resiliency of the shell 60. This locks the turbine 52 to the turbines 70 and 150 so that all of the turbines rotate in unison.

If the shift valve assumes the cruise position, pressure is allowed to pass from a pressure feed passage 284 to the passage 276, thus pressurizing the cavity between the shroud 72 and the shell 60. Passage 284 in turn communicates with passage 270. At the same time communication between passage 276 and the exhaust port 282 is interrupted. This causes a balance in the pressures in the torus region and in the cavity between the shroud 72 and the shell 60. The friction elements 90 and 92 thus become disengaged to permit freewheeling of the first turbine 52.

Movement of the shift valve is controlled by means of a control pressure signal that is distributed thereto through a passage 286. The pressure force established by this signal opposes the force of spring 280. Distribution of this control pressure signal in turn is controlled by a signal valve 288 which also has two operating positions. These positions are referred to as a left-hand position and a right-hand position with reference to FIGURE 3. When the signal valve 288 assumes a left-hand position, communication is established between the pressure feed passage 290 and passage 286. Passage 290 in turn communicates with the high presure side of the pump P. An exhaust port 292 in the signal valve becomes disconnected from the passage 286 when the signal valve assumes the left-hand position. Thus when the signal valve assumes a left-hand position, the shift valve will assume the left-hand position and cause the passage 276 to become pressurized.

If the signal valve assumes the right-hand position, communication is established between passage 286 and the exhaust port 292. At the same time, communication between passage 290 and passage 286 becomes blocked.

An engine torque demand pressure signal is distributed to the signal valve through a so-called throttle valve presure passage 294, the force exerted upon the signal valve by this pressure signal is opposed by a governor pressure signal which is distributed thereto through a governor pressure passage 296. This governor pressure signal is proportional in magnitude to the driven speed of the power output shaft 190. The sginal valve can be calibrated to respond to these two opposed pressure signal forces so that the first turbine 52 can be clutched and declutched wherever the desired converter speed ratio is obtained during the acceleration period.

The throttle valve pressure signal is obtained by means of a throttle valve mechanism 298 which is supplied with control pressure by the passage 290. It may respond to an engine manifold pressure responsive servo 300 to modulate the pressure in passage 298 to produce a resultant signal in passage 294 that is proportional in magnitude to engine manifold pressure. This in turn is an indicator of engine torque. An appropriate exhaust port 302, of course, is incorpated in the throttle valve system in order to effect this modulation.

A governor valve system 304 is employed for producing a speed signal in passage 294. It is supplied with control pressure from the passage 290. An appropriate exhaust port 306 forms a part of the governor valve system. The pressure in the passage 290 is modulated to produce a resultant signal in passage 296 that is an indicator of the driven speed. The governor valve system may include a centrifugally operated valve arrangement that is drivably connected to the shaft 190 in the usual fashion, so that the modulating characteristics of the system will respond to changes in the speed of shaft 190.

Referring next to FIGURE 4, I have shown an alternate arrangement that includes a second clutching mechanism for connecting the stator 112 to the impeller during cruising operation. As explained previously, the stator 112 functions in the usual fashion during low speed ratio operation to change the tangential component of the absolute fluid flow velocity vector. During operation in the intermediate speed ratio and during operation in the coupling range, however, the stator 112 normally would freewheel. I have provided a friction clutch mechanism 308 within the inter-torus of the converter for connecting selectively the stator 112 to the impeller. I contemplate that the clutch 308 will be engaged during cruising performance so that the stator 112 will rotate in unison with the impeller.

By referring to FIGURE 2, it will be apparent that this condition will alter the effective flow exit geometry for the impeller. The effective blade angle for the impeller normally would be equal to angle $\gamma$ shown in FIGURE 2. After the clutch 308 is engaged, however, the effective exit angle for the impeller is equal to the stator exit angle $T_{1'}$. The increase in the effective blade angle for the impeller provides a more favorable flow entrance condition for the second turbine and reduces the so-called size factor of the converter mechanism. The size factor, for purposes of this discussion, is defined as the engine speed divided by the square root of the engine torque. It may be shown analytically that this improves substantially the coupling efficiency during cruising operation.

Having thus described the preferred embodiments of my invention, what I claim and desire to secure by U.S. Letters Patent is:

1. A hydrokinetic power transmission mechanism comprising an impeller and multiple turbines situated in a common toroidal fluid flow circuit, one turbine being connected to a driven member, said impeller being connected to a driving member, and selectively engageable friction clutch means for connecting together said one turbine and a second turbine for rotation in unison during operation in a first speed ratio range and for declutching said second turbine from said one turbine during operation in another speed ratio range, said second turbine assuming a free floating condition when it is disconnected from said one turbine, said one turbine being located at the flow exit region of said impeller and said second turbine being located downstream in said flow circuit with respect to said one turbine.

2. A torque converter mechanism comprising an impeller, a first turbine and a second turbine situated in toroidal fluid flow relationship in a common torus circuit, said first turbine being located at the flow exit section of said impeller at a radially outward flow region of said torus circuit, said second turbine being connected to a driven member, said impeller being connected to a driving member, and selectively engageable friction clutch means for connecting together said turbines for rotation in unison during operation in a portion of the speed ratio range.

3. A hydrokinetic torque converter mechanism comprising an impeller, a first bladed turbine situated at the flow exit region of said impeller, a first stator situated at the flow exit region of said first turbine, a second bladed turbine situated at the flow exit region of said first stator, and a second stator situated at the flow exit region of said second turbine, said impeller, said turbines and said stator being arranged in toroidal fluid flow relationship, selectively engageable clutch means for connecting together said turbines for rotation in unison during operation in a portion of the speed ratio range, said turbines defining in part a common turbine assembly adapted to deliver driving torque to said driven member, and means for selectively disengaging said clutch means to permit free floating movement of said first turbine whereby the the flow entrance blade geometry for said turbine assembly is determined by the geometry of said second turbine.

4. A hydrokinetic torque converter mechanism comprising a bladed impeller, a first bladed turbine situated at the flow exit region of said impeller, a first stator situated at the flow exit region of said first turbine, a second bladed turbine situated at the flow exit region of said first stator, and a second stator situated at the flow exit region of said second turbine, said impeller, said turbine and said stator being arranged in toroidal fluid flow relationship, selectively engageable clutch means for connecting together said turbines for rotation in unison during operation in a portion of the speed ratio range, said turbines defining in part a common turbine assembly adapted to deliver driving torque to said driven member, means for selectively disengaging said clutch means to permit free floating movement of said first turbine whereby the flow entrance blade geometry for said turbine assembly is determined by the geometry of said second turbine and second selectively engageable clutch means for connecting said first stator to said impeller during operation in a high speed ratio range thereby altering the effective flow exit blade geometry of said impeller.

5. In a hydrokinetic torque converter mechanism having in a torus circuit multiple turbines and multiple stators in fluid flow relationship with respect to a common impeller, a first of said turbines being located at the flow exit section of said impeller at a radially outward region of said circuit, a first of said stators being located at a radially outward region of said circuit between said first turbine and a second turbine, the latter accommodating radial inflow, selectively engageable clutch means for connecting one of said stators to said impeller during operation in a portion of the speed ratio range thereby altering the effective geometry of the flow exit section of said impeller to condition said torque converter mechanism for high efficiency cruising operation by providing a favorable flow entrance angle for said second turbine during high speed ratio operation.

6. A hydrokinetic torque converter mechanism comprising an impeller, first, second and third turbines and first, second and third stators situated in a common torus circuit, said second and third turbines being connected together for rotation in unison, and selectively engageable clutch means for connecting said first turbine to said second and third turbines during operation in a portion of the speed ratio range, the first stator being located at the flow exit region of said first turbine, the second stator being located at the flow exit region of said second turbine, and the third stator being located at the flow exit region of said third turbine.

7. A hydrokinetic torque converter mechanism comprising an impeller, first, second and third turbines and first, second and third stators situated in a common torus circuit, said second and third turbines being connected together for rotation in unison, and selectively engageable clutch means for connecting said first turbine to said second and third turbines during operation in a portion of the speed ratio range, the first stator being located at the flow exit region of said first turbine, the second stator being located at the flow exit region of said second turbine and the third stator being located at the flow exit region of said third turbine, said first turbine and said first stator being located at a radially outward region of said circuit and said third turbine and said second and third stators being located at a radially inward region of said circiut.

8. A hydrokinetic torque converter mechanism comprising an impeller, first, second and third turbines and first, second and third stators situated in a common torus circuit, said second and third turbines being connected together for rotation in unison, selectively engageable first clutch means for connecting said first turbine to said second and third turbines during operation in a portion of the speed ratio range, the first stator being located at the flow exit region of said first turbine, the second stator being located at the flow exit region of said second turbine and the third stator being located at the flow exit region of said third turbine and selectively engageable cruise clutch means for connecting said impeller to said first stator during operation in a high speed ratio range.

9. A hydrokinetic torque converter mechanism comprising an impeller, first, second and third turbines and first, second and third stators situated in a common torus circiut, said second and third turbines being connected together for rotation in unison, selectively engageable first clutch means for connecting said first turbine to said second and third turbines during operation in a portion of the speed ratio range, the first stator being located at the flow exit region of said first turbine, the second stator being located at the flow exit region of said second turbine and the third stator being located at the flow exit region of said third turbine, said first turbine and said first stator being located at a radially outward region of said circuit and said third turbine and said second and third stators being located at a radially inward region of said circuit and selectively engageable cruise clutch means for connecting said impeller to said first stator during operation in a high speed ratio range.

References Cited by the Examiner
UNITED STATES PATENTS

| | | | |
|---|---|---|---|
| 2,749,710 | 6/1956 | Russell | 60—54 |
| 2,891,828 | 6/1959 | Winchell | 60—54 X |
| 3,096,613 | 7/1963 | Winchell et al. | 60—54 X |
| 3,152,446 | 10/1964 | Foerster et al. | 60—54 |
| 3,162,016 | 12/1964 | Jandasek | 60—54 |

EDGAR W. GEOGHEGAN, *Primary Examiner.*